United States Patent [19]

Feichtiger et al.

[11] Patent Number: 4,998,447

[45] Date of Patent: Mar. 12, 1991

[54] DEVICE FOR COUPLING AND/OR UNCOUPLING AT LEAST THE CORES OF TWO CABLE LINE SECTIONS

[75] Inventors: Dieter Feichtiger, Aidlingen; Horst Holzhauer, Schellbronn; Rudi Kneib; Marko Polic, both of Sindelfingen; Gunther Weikert, Weil der Stadt, all of Fed. Rep. of Germany

[73] Assignee: Daimler-Benz AG, Fed. Rep. of Germany

[21] Appl. No.: 301,838

[22] Filed: Jan. 26, 1989

[30] Foreign Application Priority Data

Jan. 26, 1988 [DE] Fed. Rep. of Germany ....... 3802107

[51] Int. Cl.[5] .............................................. F16C 1/22

[52] U.S. Cl. .................................. 74/502.6; 292/201; 292/225; 292/254

[58] Field of Search ............... 74/502.6; 292/254, 201, 292/225; 403/322, 330

[56] References Cited

U.S. PATENT DOCUMENTS 518,119 4/1894 Schnepf .......................... 292/201 X
654,383 7/1900 Carleton .............................. 292/201
3,386,761 6/1968 Johnstone et al. .
4,752,092 6/1988 Faust .............................. 292/201 X

FOREIGN PATENT DOCUMENTS 0142319 11/1984 European Pat. Off. .
2116448 10/1972 Fed. Rep. of Germany .
2314957 11/1973 Fed. Rep. of Germany .
2635505 2/1978 Fed. Rep. of Germany .
2905958 11/1982 Fed. Rep. of Germany .
3500550 10/1985 Fed. Rep. of Germany .
1228974 9/1960 France ............................... 292/201
167851 8/1921 United Kingdom ............... 292/201
1434505 5/1976 United Kingdom .

*Primary Examiner*—Rodney M. Lindsey
*Attorney, Agent, or Firm*—Evenson, Wands, Edwards, Lenahan & McKeown

[57] ABSTRACT

A device for coupling and uncoupling at least the cores of two cable line sections is disclosed, particularly for use in a motor vehicle theft prevention installation for prevention unauthorized opening of the engine hood and the like. A control element is provided by which positive engagment of two shaped parts each connected to a cable line core can be created and/or cancelled by remote control.

16 Claims, 2 Drawing Sheets

DEVICE FOR COUPLING AND/OR UNCOUPLING AT LEAST THE CORES OF TWO CABLE LINE SECTIONS

BACKGROUND AND SUMMARY OF THE INVENTION

The invention relates to a device for coupling and/or uncoupling at least the cores of two cable line sections which transmit tensile forces during control movements, particularly two sections of a remote hood lock release cable line in a motor vehicle. Such a device includes an arrangement for creating and/or cancelling a positive engagement between two corresponding shaped parts connected firmly, at least indirectly, each to an end of a cable line core, which are arranged guided in a common movement direction of the two cable line cores for displacement in common with the latter.

A generic coupling device for cable lines or Bowden cables is known from German Patent (DE-PS) 2,905,958. This device permits the manual separation of the cores and of the sheaths of two cable line sections for overhaul and inspection work, and likewise manual rejoining of the cable line cores and cable line sheaths after the conclusion of this work.

It is also disclosed in German Published Unexamined Patent Application (DE-OS) 2,116,448, in a motor vehicle theft prevention installation, to block a cable line which serves for the remote engine hood lock release, by means of a control drive to be actuated by remote control by external force, that is to say to secure it so that the cable line can no longer be moved to release the engine hood.

A blocking device for the release lever and the compartment hood release system is also known from GB-PS 1,434,505, in which however a specific security cable line mechanically securable via the ignition lock is coupled to the release lever by the positive engagement of two corresponding shaped parts displaceable conjointly with the release lever. When the secured security cable line is cut the first shaped part, which is connected firmly to the latter, is displaced by a helicoidal spring relative to the second shaped part, which is connected to the release lever, the second shaped part being brought into positive engagement via a curved sliding surface of the first shaped part with a step of the housing which encases and indirectly guides the two shaped parts. Displacement of the release lever and release cable line in the release direction is again intended to be prevented by this renewed positive engagement at a different point. According to the said GB-PS the actual release cable line is neither blocked directly nor uncoupled from the release lever or per se.

The customary engine hood release lever is easily accessible particularly in convertible vehicles which, although parked with locked doors, have an open roof. With the cable line blocking devices cited and others installable purely mechanically, such as described in German Published Unexamined Patent Application (DE-OS) 2,314,957 and 2,635,505, it is impossible to exclude the possibility of unauthorized persons overcoming the blockage of the cable line by using force and obtaining access to the engine compartment, in order to disconnect the terminals of the vehicle battery there, for example, and thereby disconnect any theft warning installation which may be present.

Lastly, a device is also known which permits the displacement stroke of a continuous cable line core in its sheath to be limited to adjustable distances (U.S. Pat. No. 3,744,339). It serves particularly to restrict the opening angle of a throttle flap of a vehicle engine carburetor for a specific group of users, said throttle flap being actuated via the cable line core. For this purpose a dog is screwed onto the cable line, its movement along the cable direction being limitable by a stop means adjustable in the same direction.

An object of the invention is to simplify the actuation of a generic device, particularly in order to promote its advantageous usefulness in a motor vehicle theft prevention installation of the type stated.

This object is achieved according to the invention by providing an arrangement wherein the two shaped parts are preloaded by spring force into a defined rest position within a housing which accommondates the mutually facing ends of the cable line cores and the shaped parts, and wherein a control member is provided in the housing which is movable by a control element by remote control with external force into two mutually opposite limit positions and at least indirectly operatively associated with a first of thè shaped parts at least in its defined rest position—to create and cancel the positive engagement of the first shaped part with the second shaped part.

The features of the dependant claims characterize advantageous further developments of the device according to the invention.

When, according to the invention, two cable line sections can be uncoupled by remote control, this simplifies the actuation of any desired couplings for cable line sections. In the context of a centrally controlled theft prevention installation for motor vehicles, the interruption of the flux of force in the cable line, of a remote engine hood release, for example, has the advantage over a blockage of the cable line that any use of force on the release lever can have no effect upon the hood lock or upon the actual cable line.

It is in fact known (see German Published Unexamined Patent Application - DE-OS-3,500,550) in conjunction with a door locking system to bring two pivot levers into and out of coupling coincidence by means of a control element for example, a cable line for lock actuation being articulated to one of the pivot levers.

In contrast to the generic cable line coupling device, this pivot lever device is not suitable for arrangement in the axis of movement of two cable line cores.

Other objects, advantages and novel features of the present invention will become apparent from the following detailed description of the invention when considered in conjunction with the accompanying drawings.

DETAILED DESCRIPTION OF THE DRAWINGS

Figure 1:
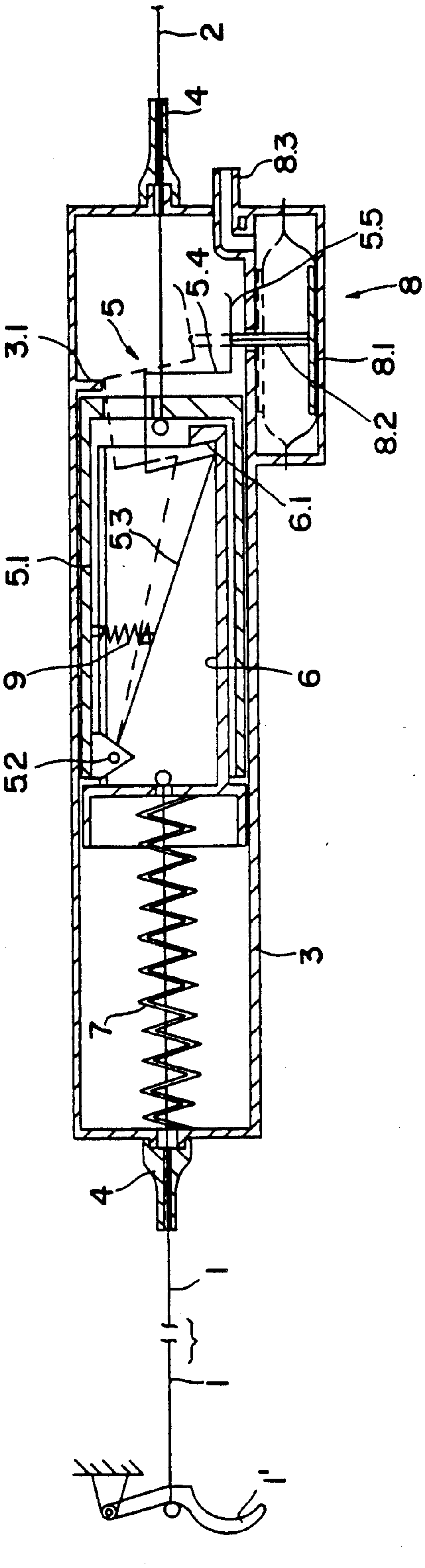
FIG. 1 is a schematic sectional view of a cable line connection arrangement constructed in accordance with a preferred embodiment of the present invention.

FIG. 1 shows two cable line cores 1 and 2, which have been introduced from mutually opposite head sides into a housing 3. The core 1 is connected, for example, to an engine hood release lever 1' in the passenger compartment of a motor vehicle, wherein the core 2 may be connected to an engine hood lock opener, not shown, in the engine compartment of the motor vehicle. Outside the substantially cylindrical housing 3, both cores 1 and 2 are sheathed in customary manner with longitudinal displaceability by cable line guides 4.

In the interior of the housing 3, which is fastened at a point in the vehicle inaccessible from outside, a first shaped part assembly 5 is connected to the core 2. Part assembly 5 consists of a sliding sleeve 5.1 guided in the housing 3 so as to be displaceable in the direction of movement of the cable line cores 1 and 2, and of a pawl 5.3 articulated in the sliding sleeve via a joint 5.2. The pawl 5.3 also exhibits an actuating lever 5.4 and a sliding surface 5.5 formed on the latter. The pawl 5.3 can also be formed on the sliding sleeve 5.1 integrally via a resilient web.

A second shaped part assembly 6 is connected to the core 1. Part assembly 6 exhibits an abutment 6.1 which corresponds to the pawl 5.3 and engages positively in the position of the latter shown by solid lines, and it is guided displaceably within the sliding sleeve 5.1. The second shaped part 6 is preloaded into the sliding sleeve 5.1 by a helicoidal compression spring 7 which is braced, in a coaxial arrangement to the core 1, between a housing head side and the shaped part 6. The sliding sleeve 5.1 is also pressed against a stop 3.1 of the housing 3 by the force of the helicoidal compression spring 7. In this defined rest position of the two shaped part assemblies 5 and 6, the pawl 5.3 is freely movable relative to the abutment 6.1.

A pneumatic control element 8 is also provided in the housing 3. Its diaphragm piston 8.1 can be moved with a control member 8.2 constructed as a push rod into two stable limit positions, shown by solid lines and dash lines respectively, by alternate stressing with positive and negative pressure, for example by a bipressure pump controllable by means of a key, through a connecting pipe 8.3.

The control member 8.2 which is introduced into the housing 3 fluid tightly relative to the diaphragm piston working chamber, is operatively associated with the sliding surface 5.5 of the pawl actuation lever 5.4 when the two shaped part assemblies 5 and 6 occupy their rest position. A helicoidal compression spring 9 preloads the pawl 5.3 against the abutment 6.1 on the one hand, and the sliding surface 5.5 against the control member 8.2 on the other hand.

In the solid line position of pawl 5.3 and control element 8, a transmission of tensile forces is possible by the flux of force-lever 1' - core 1 - shaped part 6 / abutment 6.1 - pawl 5.3 / sliding sleeve 5.1 - core 2.

In the dash line position of pawl 5.3 and control element 8, the flux of force between the abutment 6.1 and the pawl 5.3 is interrupted, because the pawl is lifted over the sliding surface 5.5 and/or the actuating lever 5.4 by the control member 8.2 and the positive engagement of the two shaped parts is cancelled. If the lever 1' is now pulled, then the second shaped part 6 will simply move out of the sliding sleeve 5.1 counter to the returning helicoidal compression spring 7, and return into the illustrated position after the lever 1' is released. The diaphragm piston 8.1 shown has a resilient characteristic similar to a overcenter spring and maintains the raised pawl 5.3 in its position even without permanent pressure stress.

Figure 2:
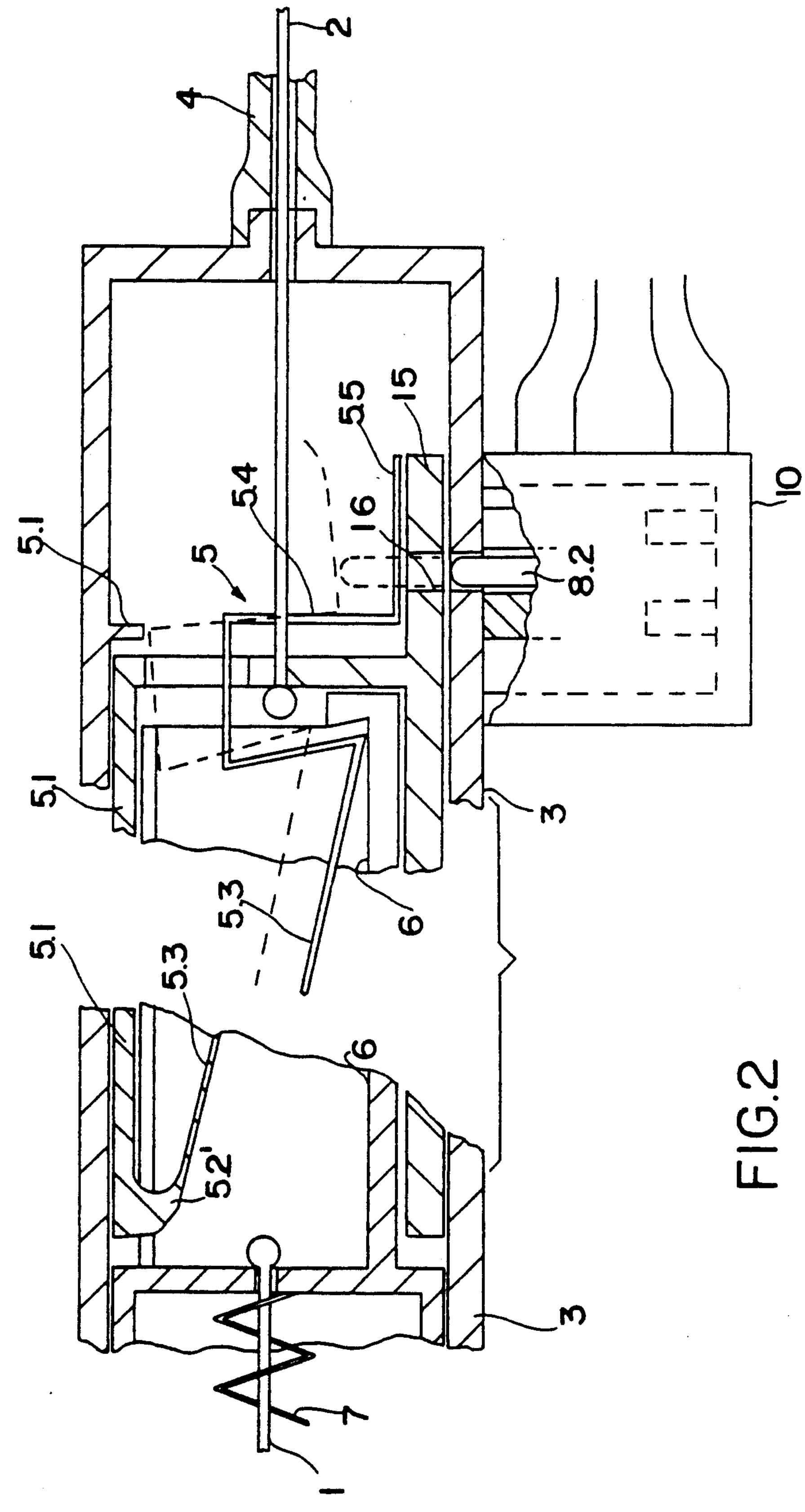
FIG. 2 illustrates a further embodiment of the present invention including a control element with an electromagnetic dual coil drive.

In a simply realized variant of the device, which is shown in FIG. 2, the raised control member 8.2 also penetrates a bore 16 formed on the first shaped part 5, with a strap 15 for example, so that this is also secured positively in addition to the interruption of the flux of force described.

In the context of a purely electrically controlled central theft prevention installation, the control element may also be constructed with an electromagnet coil drive, for example, an electromagnetic dual coil drive 10, schematically shown according to other contemplated embodiments as shown in FIG. 2. In this case however the control member should be subject to the influence of a overcenter spring, in order that its limit positions are in each case fixed.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Device for coupling and/or uncoupling at least the core of two cable line sections which transmit tensile forces during control movements, particularly two sections of a remote hood lock release cable line in a motor vehicle, by creating and/or cancelling a positive engagement between first and second corresponding shaped parts connected firmly, at least indirectly, each to an end of a cable line core, which are arranged guided in a common movement direction of the two cable line cores for displacement in common with the latter when the shaped parts are in positive engagement with each other, comprising the first and second shaped parts are preloaded by a spring force provided by a spring into a defined rest position within a housing which permits the shaped parts to move in common with the cable line cores when the shaped parts are in positive engagement with each other and accommodates mutually facing ends of the cable line cores and the shaped parts and wherein a control member is provided in the housing which is movable by a control element by remote control with external force into two mutually opposite limit positions and is at least indirectly operatively associated with the first of the shaped parts, at least in its defined rest position, to create and cancel the positive engagement of the first shape part with the second shaped part.

2. Device according to claim 1, wherein the control element is likewise arranged in the housing.

3. Device according to claim 1, wherein the control element is arranged stationary in the housing, and wherein the control member guided in the housing is contacted slidingly with the first shaped part.

4. Device according to claim 1, wherein the two shaped parts are furthermore preloaded relative to each other by the spring force in a direction which facilitates the cancellation of their positive engagement.

5. Device according to claim 1, wherein the spring force is generated by a helicoidal compression spring which is arranged concentrically to the first cable line core extending entirely between the second shaped part and a cable line actuating lever and is braced between the housing and the second shaped part, which presses the first shaped part via the second shaped part against a stop integral with the housing.

6. Device according to claim 1, wherein the first shaped part is constructed as a sliding sleeve guided displaceably for a specific distance in the housing and having a pawl arranged movably in the sliding sleeve and positively engageable with the second shaped part, the pawl exhibiting an actuating lever contactable with the control member, and wherein the second shaped part is guided in the sliding sleeve, exhibits an abutment for the positive engagement with the pawl and is displaceable relative to the first shaped part, counter to the spring force, after the positive engagement of the pawl into the abutment is cancelled by the control member.

7. Device according to claim 5, wherein the first shaped part is constructed as a sliding sleeve guided displaceably for a specific distance in the housing and having a pawl arranged movably in the sliding sleeve and positively engageable with the second shaped part, the pawl exhibiting an actuating lever contactable with the control member, and wherein the second shaped part is guided in the sliding sleeve, exhibits an abutment for the positive engagement with the pawl and is displaceable relative to the first shaped part, counter to the spring force, after the positive engagement of the pawl into the abutment is cancelled by the control member.

8. Device according to claim 7, wherein the actuating lever of the pawl exhibits a sliding surface which, in the defined rest position of the two shaped parts, rests upon the linearly displaceable control member, which is constructed as a push rod.

9. Device according to claim 7, wherein the pawl is preloaded resiliently towards the abutment and the actuating lever is preloaded resiliently towards the control member.

10. Device according to claim 7, wherein the pawl is formed on the sliding sleeve integrally via a resilient web.

11. Device according to claim 7, wherein the pawl is connected firmly but pivotably to the sliding sleeve by a joint.

12. Device according to claim 5, wherein a bore is furthermore provided on the first shaped part and penetrable by the control member in the defined rest position of the former, by means of which bore the first shaped part can be blocked in the housing and relative to the displaceable second shaped part by the control member.

13. Device according to claim 1, wherein the control element exhibits a pneumatically controllable diaphragm piston.

14. Device according to claim 1, wherein the control element is connected by at least one connecting line to a centrally controllable theft prevention installation present in the motor vehicle for the remote control of the control member.

15. Device according to claim 1, wherein in the control member is maintained in its respective limit position mechanically by a overcenter spring characteristic.

16. Device according to claim 15, wherein the control element exhibits an electromagnetic dual coil drive having a overcenter spring which engages the control member.

* * * * *